United States Patent
Hayashi et al.

(10) Patent No.: US 11,208,537 B2
(45) Date of Patent: Dec. 28, 2021

(54) EXPANDED THERMOPLASTIC POLYURETHANE PARTICLES AND EXPANDED THERMOPLASTIC POLYURETHANE PARTICLE MOLDED ARTICLE

(71) Applicant: JSP Corporation, Tokyo (JP)

(72) Inventors: Tatsuya Hayashi, Yokkaichi (JP); Nobumasa Koshita, Mibu-machi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 239 days.

(21) Appl. No.: 16/463,755

(22) PCT Filed: Nov. 15, 2017

(86) PCT No.: PCT/JP2017/041051
§ 371 (c)(1),
(2) Date: May 23, 2019

(87) PCT Pub. No.: WO2018/096997
PCT Pub. Date: May 31, 2018

(65) Prior Publication Data
US 2019/0382550 A1  Dec. 19, 2019

(30) Foreign Application Priority Data

Nov. 28, 2016 (JP) .............................. JP2016-230178

(51) Int. Cl.
*C08J 9/232* (2006.01)
*C08J 9/20* (2006.01)

(52) U.S. Cl.
CPC ................. *C08J 9/232* (2013.01); *C08J 9/20* (2013.01); *C08J 2203/06* (2013.01); *C08J 2203/22* (2013.01); *C08J 2375/08* (2013.01)

(58) Field of Classification Search
CPC ....... C08J 9/122; C08J 9/18; C08J 9/20; C08J 9/232; C08J 2203/06; C08J 2203/22; C08J 2375/08
See application file for complete search history.

(56) References Cited

U.S. PATENT DOCUMENTS

| 10,793,694 | B2 * | 10/2020 | Koshita | ............... B29C 44/3461 |
| 2012/0329892 | A1 | 12/2012 | Prissok et al. | |
| 2014/0272379 | A1 | 9/2014 | Watkins et al. | |
| 2016/0271847 | A1 | 9/2016 | Watkins et al. | |
| 2016/0297943 | A1 | 10/2016 | Däschlein et al. | |
| 2017/0218154 | A1* | 8/2017 | Huang | ....................... C08J 9/18 |
| 2017/0259473 | A1 | 9/2017 | Baghdadi et al. | |
| 2018/0272577 | A1 | 9/2018 | Baghdadi et al. | |
| 2019/0366600 | A1 | 12/2019 | Baghdadi et al. | |

FOREIGN PATENT DOCUMENTS

| CN | 103804889 | * | 5/2014 | |
| CN | 105102518 | A | 11/2015 | |
| CN | 107614583 | A | 1/2018 | |
| CN | 109312100 | A | 2/2019 | |
| EP | 3095812 | A1 | 11/2016 | |
| EP | 3305837 | A1 | 4/2018 | |
| EP | 3438174 | A1 | 2/2019 | |
| EP | 3438175 | A1 | 2/2019 | |
| EP | 3480243 | A1 | 5/2019 | |
| JP | H08-113664 | A | 5/1996 | |
| JP | 2014-062213 | A | 4/2014 | |
| WO | 2015/052265 | A1 | 4/2015 | |
| WO | 2016/131671 | A1 | 8/2016 | |
| WO | WO-2016194737 | A1 | * 12/2016 | ............. C08J 9/228 |

OTHER PUBLICATIONS

Extended European Search Report issued in corresponding EP Application No. 17874696.2 dated Mar. 12, 2020 (8 pages).
International Search Report for PCT/JP2017/041051, dated Feb. 20, 2018, and English Translation submitted herewith (5 pages).
Hossieny et al., "Crystallization of hard segment domains with the presence of butane for microcellular thermoplastic polyurthane foams," Polymer, Dec. 21, 2013, 55, pp. 651-662.
Hossieny, et al., "Effects of Glycerol Monosterate on TPUs Crystallization and its Foaming Behavior," AIP Conference Proceedings, 2014, 1593, pp. 374-377.
Office Action issued in corresponding CN Application No. 201780072423.6 dated Mar. 26, 2021 (7 pages).

* cited by examiner

*Primary Examiner* — John M Cooney
(74) *Attorney, Agent, or Firm* — Fitch, Even, Tabin & Flannery LLP

(57) ABSTRACT

The present invention provides expanded beads of thermoplastic polyurethane, wherein the thermoplastic polyurethane constituting the expanded beads is an ether-based thermoplastic polyurethane, and a difference ($T_1-T_2$) between a melting peak temperature ($T_1$) and a melting peak temperature ($T_2$) is from 0 to 8° C., wherein the melting peak temperature ($T_1$) is a melting peak temperature at the time of first heating in a DSC curve obtained by heating the expanded beads from 20° C. to 260° C. at a heating rate of 10° C./min, the melting peak temperature ($T_2$) is a melting peak temperature at the time of second heating in a DSC curve obtained by cooling from 260° C. to 20° C. at a cooling rate of 10° C./min after the first heating and further heating again from 20° C. to 260° C. at a heating rate of 10° C./min, and the DSC curves are obtained by the heat flux differential scanning calorimetry in conformity with JIS K7121-1987. The expanded beads of thermoplastic polyurethane not only have excellent surface appearance and fusion bonding properties but also have a low shrinkage factor.

8 Claims, No Drawings

EXPANDED THERMOPLASTIC POLYURETHANE PARTICLES AND EXPANDED THERMOPLASTIC POLYURETHANE PARTICLE MOLDED ARTICLE

CROSS-REFERENCE TO RELATED APPLICATIONS

This application is a U.S. national phase application filed under 35 U.S.C. § 371 of International Application Number PCT/JP2017/041051, filed Nov. 15, 2017, designating the United States, which claims priority from Japanese Application Number 2016-230178, filed Nov. 28, 2016.

FIELD OF THE INVENTION

The present invention relates to expanded beads of thermoplastic polyurethane and an expanded thermoplastic polyurethane beads molded article.

The thermoplastic polyurethane is hereinafter sometimes abbreviated as "TPU".

BACKGROUND OF THE INVENTION

Although TPU is one kind of thermoplastic elastomers, it exhibits characteristics close to those of vulcanized rubbers and is excellent in wear resistance, cold resistance, repulsion elasticity, and so on. In addition, the TPU is high in mechanical strength, and therefore, the TPU is positioned as an engineering elastomer and used for a variety of applications, such as cushioning materials, vibration-damping materials, sports goods, and automobile members.

An expanded molded article obtained through expansion of this TPU is able to contemplate lightness in weight and softening, while keeping excellent characteristics, such as wear resistance and repulsion elasticity, and hence, further application development of sports goods, automobile members, and so on is expected in the future. The expanded molded article of TPU can be produced by an extrusion expansion method, an in-mold molding method using expanded beads, or the like. In particular, expanded beads applicable for the in-mold molding method are recently required in view of the matter that expanded molded articles having various shapes in conformity with a mold shape are obtained.

As such expanded beads, in general, there are those examples as described in PTLs 1 and 2.

CITATION LIST

Patent Literature

PTL 1: JP 8-113664 A
PTL 2: US 2012/0329892 A

SUMMARY OF INVENTION

Technical Problem

However, in conventional expanded beads having TPU as a base material, in the case of subjecting the expanded beads to in-mold molding to obtain an expanded beads molded article, the molded article was not always satisfied with surface appearance, fusion bonding properties, and shrinkage factor.

In order to solve the aforementioned problem, the present invention has been made, and an object thereof is to provide an expanded thermoplastic polyurethane beads molded article not only having excellent surface appearance and fusion bonding properties but also having a low shrinkage factor; and expanded beads of thermoplastic polyurethane from which the foregoing molded article can be obtained.

Solution to Problem

Specifically, the present invention provides the following [1] to [6].

[1] Expanded beads of thermoplastic polyurethane, wherein the thermoplastic polyurethane constituting the expanded beads is an ether-based thermoplastic polyurethane, and a difference ($T_1-T_2$) between a melting peak temperature ($T_1$) and a melting peak temperature ($T_2$) is from 0 to 8° C., wherein the melting peak temperature ($T_1$) is a melting peak temperature at the time of first heating in a DSC curve obtained by heating the expanded beads from 20° C. to 260° C. at a heating rate of 10° C./min, the melting peak temperature ($T_2$) is a melting peak temperature at the time of second heating in a DSC curve obtained by cooling from 260° C. to 20° C. at a cooling rate of 10° C./min after the first heating and further heating again from 20° C. to 260° C. at a heating rate of 10° C./min, and the DSC curves are obtained by the heat flux differential scanning calorimetry in conformity with JIS K7121-1987.

[2] The expanded beads of thermoplastic polyurethane as set forth in the above [1], wherein the difference ($T_1-T_2$) between the melting peak temperature ($T_1$) at the time of first heating and the melting peak temperature ($T_2$) at the time of second heating is from 1 to 6° C.

[3] The expanded beads of thermoplastic polyurethane as set forth in the above [1] or [2], wherein the melting peak temperature ($T_2$) at the time of second heating is from 155 to 170° C.

[4] The expanded beads of thermoplastic polyurethane as set forth in any one of the above [1] to [3], wherein a melt flow rate at 190° C. under a load of 10 kg of the expanded beads is from 18 to 35 g/10 min.

[5] The expanded beads of thermoplastic polyurethane as set forth in any one of the above [1] to [4], wherein an apparent density of the expanded beads is from 80 to 300 kg/m³.

[6] An expanded thermoplastic polyurethane beads molded article obtained through in-mold molding of the expanded beads of thermoplastic polyurethane as set forth in any one of the above [1] to [5].

In accordance with the present invention, it is possible to provide an expanded thermoplastic polyurethane beads molded article not only having excellent surface appearance and fusion bonding properties but also having a low shrinkage factor; and expanded beads of thermoplastic polyurethane from which the foregoing molded article can be obtained.

DESCRIPTION OF EMBODIMENTS

<Expanded Ether-Based Thermoplastic Polyurethane Beads>

In the expanded beads of thermoplastic polyurethane, the thermoplastic polyurethane constituting the expanded beads is an ether-based thermoplastic polyurethane, and a difference ($T_1-T_2$) between a melting peak temperature ($T_1$) and a melting peak temperature ($T_2$) is 0 to 8° C., wherein the melting peak temperature ($T_1$) is a melting peak temperature at the time of first heating in a DSC (differential scanning calorimetry) curve obtained by heating the expanded beads from 20° C. to 260° C. at a heating rate of 10° C./min, the melting peak temperature ($T_2$) is a melting peak temperature at the time of second heating in a DSC curve obtained by cooling from 260° C. to 20° C. at a cooling rate of 10° C./min after the first heating and further heating again from 20° C. to 260° C. at a heating rate of 10° C./min, the DSC curves are obtained by the heat flux differential scanning calorimetry in conformity with JIS K7121-1987. The expanded beads of thermoplastic polyurethane of the present invention are hereinafter also referred to simply as "expanded TPU beads".

As a test piece of the aforementioned DSC measurement, 1 to 3 mg of expanded beads are used. In the case where the weight per one expanded bead is less than 1 mg, plural expanded beads having a total weight of 1 to 3 mg are used as they are. In the case where the weight per one expanded bead is 1 to 3 mg, the single expanded bead is used for the measurement as it is. In the case where the weight per one expanded bead is more than 3 mg, a single cut sample having a weight of 1 to 3 mg, which is obtained by cutting a single expanded bead, is used for the measurement.

The ($T_1-T_2$) is hereinafter sometimes referred to as $\Delta T$.

In view of the fact that the expanded TPU beads of the present invention have the ether-based TPU as a base material and have a specified crystal state exhibiting the aforementioned melting characteristics, the expanded TPU beads molded article obtained by subjecting the expanded beads to in-mold molding (hereinafter sometimes referred to simply as "molded article") has a surface which is small in gaps among expanded beads and is smooth, and is excellent in surface appearance. The molded article is excellent in fusion bonding properties of the expanded beads to each other and has satisfactory mechanical physical properties. Furthermore, the molded article is made free from heating at the time of molding, and even if the temperature of the molded article is decreased, the molded article is hardly shrunk and is excellent in dimensional stability.

The expanded TPU beads can be obtained by impregnating a blowing agent in particles of the ether-based TPU (hereinafter also referred to as "raw material particles") and expanding the raw material particles containing a blowing agent. It may be considered that a hard segment of the ether-based TPU moves depending upon a heating condition on the occasion of obtaining expanded beads, or by a heat treatment of the resulting expanded beads. In this case, the ether-based TPU which is contained in the expanded beads is different in a crystal state from the ether-based TPU which is contained in the raw material particles, and the raw material particles and the expanded beads exhibit a different melting behavior from each other.

In the present invention, the melting peak temperature ($T_1$) at the time of first heating in a DSC curve obtained by heating the expanded TPU beads from 20° C. to 260° C. at a heating rate of 10° C./min is corresponding to a melting temperature to be determined from a DSC curve obtained by heating the expanded TPU beads under a predetermined condition.

Here, in the case where plural endothermic peaks appear in the DSC curve, an endothermic peak having a highest height from a base line is defined as the melting peak, and a peak temperature of the foregoing melting peak is measured. The aforementioned base line is defined as a straight line extending a base line on a high-temperature side toward a low-temperature side. The same is also applicable to a melting peak at the time of second heating as mentioned later.

In the present invention, the melting peak temperature ($T_2$) at the time of second heating in a DSC curve obtained by cooling from 260° C. to 20° C. at a cooling rate of 10° C./min after the aforementioned heating and further heating again from 20° C. to 260° C. at a heating rate of 10° C./min is corresponding to a melting temperature of the TPU to be determined from a DSC curve obtained by cooling the expanded TPU beads having been heated for measuring the $T_1$ under a predetermined condition and further heating again under a predetermined condition.

Since the crystal state in the expanded TPU beads having been changed by the heating treatment is cancelled upon heating to 260° C., the melting peak temperature ($T_2$) at the time of second heating is corresponding to a melting temperature of the raw material particles in a sense.

As is noted from the foregoing, the $\Delta T$ ($T_1-T_2$) is corresponding to a difference between the melting temperature reflecting the crystal state of the expanded TPU beads and the melting temperature which the raw material particles originally have.

In the present invention, the $\Delta T$ is 0° C. or higher, and the melting temperature of the expanded TPU beads is equal to or higher than the melting temperature of the raw material particles. In expanded polypropylene-based resin particles and so on, typically, as the melting temperature becomes high, a pressure of steam required for in-mold molding (molding pressure) tends to increase. However, in the expanded TPU beads of the present invention, it has been noted that as the melting temperature becomes high, the molding pressure reversely falls.

When the TPU constituting the expanded TPU beads is an ether-based TPU, and the $\Delta T$ is 0° C. or higher and 8° C. or lower, although the reason is unknown, the molded article obtained by subjecting the expanded TPU beads of the present invention to in-mold molding has excellent surface appearance and fusion bonding properties and has a low shrinkage factor.

In the case where the $\Delta T$ is lower than 0° C., namely, when the melting temperature ($T_2$) of the raw material particles is higher than the melting temperature ($T_1$) of the expanded TPU beads, the shrinkage factor of the resulting molded article becomes large, and gaps (voids) among the expanded beads on the surface of the molded article are broad, so that the surface appearance is impaired. When the $\Delta T$ is higher than 8° C., a degree of fusion bonding among the expanded beads to each other falls, and the fusion bonding properties are lowered.

The $\Delta T$ is preferably 1° C. or higher, more preferably 3° C. or higher, still more preferably higher than 3° C., and yet still more preferably 4° C. or higher. In addition, the $\Delta T$ is preferably 7° C. or lower, and more preferably 6° C. or lower.

Although the melting peak temperature ($T_2$) at the time of second heating, which is corresponding to the melting temperature of the raw material particles, is not particularly limited, it is preferably 155 to 170° C. from the viewpoint of in-mold moldability of the expanded TPU beads (viewpoint of not excessively increasing the molding pressure). From the same viewpoint, the $T_2$ is more preferably 158° C. or higher, and still more preferably 160° C. or higher, and it is more preferably 168° C. or lower.

[Ether-Based Thermoplastic Polyurethane (Ether-Based TPU)]

The thermoplastic polyurethane is one kind of thermoplastic elastomers and has a structure obtained through block copolymerization of a soft segment composed of a long-chain polyol and a hard segment obtained through polymerization of a diisocyanate and a chain extender, such as a short-chain glycol, via a urethane bond. Then, principally, the soft segment reveals stretchability, and the hard segment produces a firm hydrogen bond and acts as a physical crosslinking point to exhibit elasticity close to rubber.

Typically, the TPU includes an ester-based TPU (TPU-ES), an ether-based TPU (TPU-ET), and so on depending upon the kind of the long-chain polyol, and the kind of the long-chain polyol influences characteristics of the TPU.

Examples of the long-chain polyol of the ether-based TPU constituting the expanded TPU beads of the present invention include polyethylene glycol, polypropylene ether glycol, polytetramethylene ether glycol, and polyhexamethylene ether glycol.

Examples of the short-chain glycol include ethylene glycol, propylene glycol, butanediol, butenediol, pentanediol, neopentyl glycol, hexanediol, cyclohexanediol, diethylene glycol, diethanolamine, and triethanolamine.

Examples of the diisocyanate include tolylene diisocyanate (TDI), diphenylmethane diisocyanate (MDI), hexamethylene diisocyanate, naphthalene diisocyanate, isophorone diisocyanate, and xylene diisocyanate.

A constitutional element of the ether-based TPU is not particularly limited. The constitutional element of the ether-based TPU is properly selected according to physical properties required for the resulting expanded beads molded article. The ether-based TPU may be made of a single kind, or plural kinds in which the long-chain polyol, the short-chain glycol, and the like are different.

A type A durometer hardness of the ether-based TPU is preferably 92 or less, more preferably less than 90, and still more preferably 88 or less. So long as the hardness falls within the aforementioned range, even when the steam pressure (molding pressure) at the time of in-mold molding is not excessively increased, a favorable molded article can be obtained. In addition, when the type A durometer hardness is excessively low, after the molded article is demolded from a mold, the molded article is liable to generate remarkable shrinkage, deformation, and so-called terrible sink depending upon the molding condition and/or the shape of the molded article. For that reason, the type A durometer hardness is preferably more than 80, and more preferably 85 or more.

The type A durometer hardness means a durometer hardness (HDA) measured with a type A durometer on a basis of JIS K7215-1986. On the occasion of measuring the durometer hardness of the TPU constituting the expanded beads, a lot of expanded beads are heat-pressed to completely remove cells, thereby producing a sheet having a thickness of 4 mm, and the resulting sheet is used as a test piece.

Although the expanded TPU beads of the present invention are constituted of a polymer component containing an ether-based TPU, they may contain other thermoplastic resin and other thermoplastic elastomer than the ether-based TPU according to the object to the extent where the effects of the present invention are not impaired.

Examples of the other thermoplastic resin include a polyolefin-based resin and a polystyrene-based resin. Examples of the other thermoplastic elastomer include an ester-based TPU, a styrene-based thermoplastic elastomer (TPS), and an olefin-based thermoplastic elastomer (TPO).

The content of such other thermoplastic resin and thermoplastic elastomer in the expanded TPU beads is preferably 20% by weight or less, more preferably 10% by weight or less, and still more preferably 5% by weight or less. It is yet still more preferred that the expanded TPU beads of the present invention do not contain other thermoplastic resin and thermoplastic elastomer (the content of the ether-based TPU in the polymer component constituting the expanded beads is 100% by weight).

[Characteristics of Expanded Beads of Thermoplastic Polyurethane]

The expanded TPU beads of the present invention preferably have the following characteristics.

A melt flow rate (MFR) at 190° C. under a load of 10 kg of the expanded TPU beads is preferably 18 to 35 g/10 min, more preferably 20 to 30 g/10 min, and still more preferably 20 to 28 g/10 min from the viewpoint of moldability of the molded article.

In the present invention, the melt flow rate (MFR) is a value measured at 190° C. under a load of 10 kg on a basis of JIS K7210-2:2014. As a measurement sample, one in which a water content thereof is controlled to 500 ppm by weight or less is used.

An apparent density of the expanded TPU beads is preferably 80 to 300 kg/m$^3$.

When the apparent density of the expanded TPU beads is 80 kg/m$^3$ or more, the expanded TPU beads and the molded article are especially hardly shrunk, and a molded article having a target shape is readily obtained. In addition, when the apparent density is 300 kg/m$^3$ or less, a lightweight molded article is obtained.

The apparent density of the expanded TPU beads is more preferably 100 to 250 kg/m$^3$, and still more preferably 130 to 230 kg/m$^3$.

The apparent density of the expanded TPU beads means a value obtained by dividing a weight of the expanded beads by an apparent volume of the expanded beads. The apparent volume of the expanded beads can be measured by the water immersion method or other methods.

In the expanded beads of the present invention, an average cell diameter of the expanded beads is preferably 100 to 400 μm from the viewpoint of in-mold moldability. In addition, the average cell diameter is more preferably 120 μm or more, still more preferably 150 μm or more, and especially preferably 165 μm or more. Meanwhile, the average cell diameter is more preferably 300 μm or less.

The average cell diameter of the expanded beads is a value measured in conformity with ASTM D3576-77 in the following manner. The expanded bead is bisected so as to pass through the center of the expanded bead. An enlarged photograph of one cross section of the respective cut expanded bead is taken, and four line segments are drawn equiangularly at every 45° from the outermost surface of the expanded bead in the enlarged photograph so as to pass through the center thereof until reaching the outermost surface on the opposite side. The number of cells crossing each of the line segments is measured, respectively, and a total length of the four line segments is divided by the total number of cells crossing the line segments to determine an average chord length of the cells, which is further divided by 0.616, thereby determining the average cell diameter of the expanded beads.

[Production Method of Expanded Beads of Thermoplastic Polyurethane]

Although a production method of the expanded beads of thermoplastic polyurethane of the present invention is not particularly limited, from the viewpoint of easily producing expanded beads of thermoplastic polyurethane having the already-described range of ΔT, it is preferred to obtain the expanded beads of thermoplastic polyurethane according to a production method including the following steps (1) and (2):

Step (1): An impregnation step of impregnating a blowing agent in raw material particles; and Step (2): An expansion step of expanding the raw material particles to obtain expanded beads of thermoplastic polyurethane.

A melt flow rate (MFR) at 190° C. under a load of 10 kg of the raw material particles is preferably 40 g/10 min or less, more preferably 1 to 30 g/10 min, and still more preferably 5 to 20 g/10 min.

The raw material particles can be properly blended with, in addition to the polymer component, various additives which are typically used, such as a cell controlling agent, an antistatic agent, an electrical conductivity imparting agent, a lubricant, an antioxidant, a UV absorbing agent, a flame retardant, a metal deactivator, a colorant (e.g., a pigment and a dye), a crystal nucleus agent, and a filler, as the need arises. Examples of the cell controlling agent include inorganic cell controlling agents, such as talc, sodium chloride, calcium carbonate, silica, titanium oxide, gypsum, zeolite, borax, aluminum hydroxide, and carbon; and organic cell controlling agents, such as a phosphate-based compound, a phenol-based compound, an amine-based compound, and polytetrafluoroethylene (PTFE). Although the addition amount of such an additive of every kind varies with the application purpose of the molded article, it is preferably 25 parts by weight or less, more preferably 15 parts by weight or less, still more preferably 10 parts by weight or less, and yet still more preferably 5 parts by weight or less based on 100 parts by weight of the polymer component constituting the raw material particles other than the additives.

The raw material particles are not particularly limited with respect to the production method and can be obtained by a known method. For example, the raw material particles can be obtained by a strand cutting method in which the polymer component containing an ether-based TPU and optionally, additives, such as a cell controlling agent and a colorant, are put into an extruder and kneaded to prepare a melt kneaded product, the melt kneaded product is extruded into a strand-like form from small holes of a die annexed in a tip of the extruder, and the extruded melt is then cut in a predetermined weight by a pelletizer; a hot cutting method in which the aforementioned melt kneaded product immediately after extrusion into a gas phase is cut; an underwater cutting method (UWC method) in which the aforementioned melt kneaded product immediately after extrusion into water is cut; or other methods.

[Step (1)]

The step (1) is an impregnation step of impregnating a blowing agent in the raw material particles. Although an impregnation method of a blowing agent in the raw material particles is not particularly limited, it is preferred that the raw material particles are dispersed in a dispersing medium within a pressurizable closed vessel, such as an autoclave, and the blowing agent is impregnated in the raw material particles.

Examples of the dispersing medium include aqueous media, such as an alcohol having 3 or less carbon atoms, water, and a mixture thereof, and typically, water is used.

In the dispersing medium, it is preferred to add a dispersant, such as a sparingly water-soluble inorganic material, e.g., aluminum oxide, tricalcium phosphate, magnesium pyrophosphate, zinc oxide, kaolin, mica, and talc, as the need arises. In addition, a dispersing aid, such as an anionic surfactant, e.g., sodium dodecylbenzenesulfonate and a sodium alkanesulfonate, can also be added in the dispersing medium.

A weight ratio of the raw material particles to the dispersant ((raw material particles)/(dispersant)) is preferably 20 to 2,000. The lower limit of the weight ratio of the raw material particles to the dispersant is more preferably 30, and the upper limit thereof is more preferably 1,000. In addition, a weight ratio of the dispersant to the dispersing aid ((dispersant)/(dispersing aid)) is preferably 1 to 500. The upper limit of the weight ratio of the dispersant to the dispersing aid is more preferably 100.

As the blowing agent, a physical blowing agent or a chemical blowing agent can be used, and these can also be used in combination.

Examples of the physical blowing agent include an organic physical blowing agent and an inorganic physical blowing agent.

Examples of the organic physical blowing agent include aliphatic hydrocarbons, such as propane, butane, hexane, pentane, and heptane; alicyclic hydrocarbons, such as cyclobutane and cyclohexane; halogenated hydrocarbons, such as chlorofluoromethane, trifluoromethane, 1,1-difluoroethane, 1,1,1,2-tetrafluoroethane, methyl chloride, ethyl chloride, and methylene chloride; and dialkyl ethers, such as dimethyl ether, diethyl ether, and methyl ethyl ether. In addition, examples of the inorganic physical blowing agent include carbon dioxide, nitrogen, argon, air, and water.

It is preferred to use carbon dioxide as the blowing agent. By using carbon dioxide, refinement of the cells at the time of expansion can be prevented from occurring, and expanded beads having a favorable cell structure can be obtained. A blending ratio of carbon dioxide in the blowing agent is preferably 50 to 100% by weight. The lower limit of the blending ratio of carbon dioxide is more preferably 70% by weight, and still more preferably 90% by weight. The blending ratio of carbon dioxide is most preferably 100% by weight.

The use amount of the blowing agent is properly set taking into account the apparent density of the target expanded beads, the kind of the ether-based TPU, and the like. Typically, the use amount of the blowing agent is preferably 0.5 to 30 parts by weight based on 100 parts by weight of the raw material particles.

In order to thoroughly impregnate the blowing agent in the raw material particles within a short period of time, it is preferred to undergo the step (1) under pressure.

The pressure (impregnation pressure) within the closed vessel in the step (1) is preferably 0.5 to 10.0 MPa in terms of a gauge pressure from the viewpoint of thoroughly impregnating the blowing agent in the raw material particles. A unit of the pressure as the gauge pressure is hereinafter expressed as "MPa (G)".

From the viewpoint of more easily impregnating the blowing agent in the raw material particles, the impregnation pressure is more preferably 1.0 MPa (G) or more, and still more preferably 2.0 MPa (G) or more, and furthermore, from the standpoint of readily controlling an expansion pressure as mentioned later, the impregnation pressure is yet still more preferably more than 2.5 MPa (G), and especially preferably 2.6 MPa (G) or more. Meanwhile, from the viewpoint of suppressing refinement of the cells of the resulting expanded beads, the impregnation pressure is more preferably 7.0 MPa (G) or less, and still more preferably 5.0 MPa (G) or less, and furthermore, from the standpoint of readily controlling an expansion pressure as mentioned later, the impregnation pressure is yet still more preferably 4.0 MPa (G) or less, and especially preferably 3.4 MPa (G) or less.

A temperature (impregnation temperature) of the contents within the closed vessel at the time of impregnating the blowing agent in the raw material particles is preferably 20° C. or higher, and more preferably 80° C. or higher and "(melting temperature of raw material particles)−20" ° C. or lower.

In the step (1), a heating time (impregnation time) at the impregnation temperature is properly set according to the pressure within the closed vessel, the kind of the ether-based TPU, the weight of the raw material particles, and so on. In particular, from the viewpoint of productivity of the expanded TPU beads, the impregnation time is preferably 0.05 to 3 hours, and more preferably 0.1 to 1 hour.

According to the foregoing, the blowing agent can be impregnated in the raw material particles.

[Step (2)]

The step (2) is an expansion step of expanding the raw material particles to obtain expanded TPU beads. Although the expansion method of the raw material particles is not particularly limited, it is preferred that subsequent to the step (1), the raw material particles containing the blowing agent are released together with the dispersing medium from the closed vessel into an atmosphere of a lower pressure than the internal pressure of the closed vessel and expanded, thereby obtaining the expanded TPU beads.

A temperature (expansion temperature) when expanding the raw material particles is preferably a temperature lower by 100 to 20° C. than a melting point ($T_4$) of the raw material particles, namely, ($T_4$−100° C.) to ($T_4$−20° C.), and more preferably ($T_4$−80° C.) to ($T_4$−20° C.).

On the occasion of releasing the raw material particles from the closed vessel, it is preferred to keep the pressure within the opened closed vessel at a fixed level through pressurization with carbon dioxide, air, or the like, or to increase it step-by-step, while keeping the temperature of the contents at a fixed level. According to such pressure regulation, scattering in the apparent density or cell diameter of the resulting expanded beads can be minimized.

A pressure (expansion pressure) at the time of such release is preferably 0.5 to 10.0 MPa (G). From the viewpoint of more minimizing the scattering in the cell diameter, the expansion pressure is more preferably more than 2.5 MPa (G), and still more preferably 2.6 MPa (G) or more. In addition, from the standpoint that expanded beads that are excellent especially in in-mold moldability are readily obtained, the expansion pressure is more preferably 4.0 MPa (G) or less, and still more preferably 3.4 MPa (G) or less.

In order to obtain expanded beads having a ΔT of 0 to 8° C., in the steps (1) and (2), when a melting point of the raw material TPU is defined as $T_5$, the raw material particles are heat treated in a range of preferably ($T_5$−60° C.) to ($T_5$−20° C.), and more preferably ($T_5$−40° C.) to ($T_5$−20° C.). Although this heat treatment may be performed at any timing of before impregnation of the blowing agent, during impregnation of the blowing agent, and after impregnation of the blowing agent, it is more preferred to perform the heat treatment at the same time of impregnation of the blowing agent.

When the temperature of the heat treatment is made high, the temperature of $T_1$ becomes high accordingly, whereas when the temperature of the heat treatment is made low, the temperature of $T_1$ becomes low accordingly.

From the viewpoint of controllability of minimizing the temperature unevenness within the raw material particles or disappearing the temperature unevenness to make a value of the ΔT stable, a time of the heat treatment is preferably 5 minutes or more, and more preferably 10 minutes or more. From the viewpoint of controllability, although an upper limit thereof is not particularly limited, in order to prevent decomposition and/or yellowing of the TPU due to hydrolysis from occurring, the time of the heat treatment is preferably 30 minutes or less.

Expanded beads having the TPU as a base material are liable to cause shrinkage especially when expanded at a high expansion ratio. This shrinkage is caused due to the matter that the inside of the cell becomes in a reduced pressure state when the high-temperature gas existent in the cell of the expanded bead is cooled or dissipated to outside of the expanded bead. In particular, the carbon dioxide is liable to be dissipated to outside of the expanded bead, and therefore, shrinkage of the expanded bead is liable to be caused. In such a case, it is preferred that the expanded beads after expansion are pressurized with air and then placed under atmospheric pressure, thereby undergoing aging in a stable state. Specifically, the resulting expanded beads are put into a closed vessel and pressurized with compressed air of about 0.05 to 0.6 MPa (G) at 0 to 60° C. for 1 to 24 hours. Thereafter, the pressure of the closed vessel is released, and the expanded beads having been pressurized are allowed to stand under atmospheric pressure at 30 to 80° C. for about 12 to 72 hours.

In the case where it is contemplated to make the expansion ratio of the expanded beads as obtained above higher, two-stage expansion may be performed, as the need arises. For example, expanded beads having a lower apparent density can be obtained by giving an internal pressure to the expanded beads and heating by using steam, heated air, or the like, or other means.

<Expanded Thermoplastic Polyurethane Beads Molded Article>

An expanded thermoplastic polyurethane beads molded article of the present invention is a molded article obtained through in-mold molding of the already-described expanded beads of thermoplastic polyurethane.

An apparent density of the molded article is preferably 180 to 400 kg/m³, more preferably 190 to 350 kg/m³, and still more preferably 200 to 300 kg/m³.

Since the expanded thermoplastic polyurethane beads molded article of the present invention is excellent in surface appearance and fusion bonding properties, it can be used for various cushioning materials, such as automobile sheets and shoe soles, and it is especially suitable for a cushioning material for midsole of shoe sole.

The in-mold molding method for obtaining the expanded TPU beads molded article is not particularly limited, and a molded article having a desired form can be obtained by a known method. For example, the following methods are exemplified.

First of all, the expanded beads are filled in a known mold which is possible for heating and cooling and is able to be opened or closed and hermetically sealed. Preferably, for example, a saturated steam having a saturated vapor pressure of 0.05 to 0.50 MPa (G) (maximum value of the saturated vapor pressure of steam to be fed into the mold) is then fed as a heating medium into the mold, and the expanded beads are not only further expanded but also mutually fusion-bonded within the mold, thereby forming a molded article. The pressure of the saturated steam is more preferably 0.08 to 0.42 MPa (G).

Subsequently, this molded article is cooled and then taken out from the mold. The molded article can be produced by adopting such a batch-type in-mold molding method (see, for example, JP 4-46217 B and JP 6-49795 B).

The molded article can also be produced by a continuous molding method (see, for example, JP 9-104026 A, JP 9-104027 A, and JP 10-180888 A).

As a method of filling the expanded beads in a mold, a known method can be adopted. For example, a method in which the expanded beads are pressurized with a pressurized gas, a predetermined internal pressure is given to the expanded beads, and the resulting expanded beads are then filled in the mold (pressurization filling method); a method in which the expanded beads in a compressed state with a pressurized gas are filled in a pressurized mold, and the pressure is then released (compression filling method); a method in which prior to filling the expanded beads in a mold, the mold is opened in advance to broaden a molding space, and after filling, the mold is closed to mechanically compress the expanded beads (cracking filling method), and so on can also be adopted.

As for the heating method with a saturated water vapor in the in-mold molding method, heating methods, such as one-direction flow heating, reversed one-direction flow heating, and main heating, can be properly combined according to a known method. In particular, a method of heating the expanded beads in the order of preheating, one-direction flow heating, reversed one-direction flow heating, and main heating is preferred.

The one-direction flow heating means a method in which a heating medium is fed from either one mold side of a male mold or a female mold to heat the expanded beads, and subsequently, the heating medium is ejected from the other mold side. In addition, the case where the mold to which the heating medium is fed, and the mold from which the heating medium is ejected are opposite to those of the case of the aforementioned one-direction flow heating refers to the reversed one-direction flow heating.

EXAMPLES

The present invention is hereunder described in more detail by reference to Examples, but it should be construed that the present invention is not limited thereto.

Examples 1 to 6 and Comparative Examples 1 to 4

1. Raw Material Components

The following components were used as the TPU components and additives to be used for raw material particles.
[TPU Components]

TPU1: Ether-based thermoplastic polyurethane (manufactured by Covestro AG, a grade name: 9385A (Lot 1), MFR [at 190° C. under a load of 10 kg]: 4 g/10 min, type A durometer hardness: 86, melting temperature: 165° C.)

TPU2: Ether-based thermoplastic polyurethane (manufactured by Covestro AG, a grade name: 9385A (Lot 2), MFR [at 190° C. under a load of 10 kg]: 10 g/10 min, type A durometer hardness: 86, melting temperature: 165° C.)
[Additives]

Colorant (blue pigment master batch): Pandex B-UN91-9127-20 (pigment main component: Phthalocyanine Blue)

Cell controlling agent: Talc (manufactured by Hayashi Kasei Co., Ltd., KHP-125B, d50: 7 μm)

2. Production of Raw Material Particles

The TPU of the kind shown in Tables 1 and 2 and the cell controlling agent (talc) in an amount shown in Tables 1 and 2 based on 100 parts by weight of the TPU were fed into a twin-screw extruder having an inside diameter of 26 mm, and these were heat kneaded to prepare a melt kneaded product. The melt kneaded product was extruded into water from small holes of a die annexed in a tip of the extruder and cut, thereby obtaining raw material particles having an average weight of 10 mg and an L/D of 1.0.

In the case where the "Color" section of the "Raw material particles" section in Tables 1 and 2 is "Non-colored", the blue pigment master batch was not added, whereas in the case of "Blue", the blue pigment master batch was added in a proportion of 1 part by weight based on 100 parts by weight of the TPU.

3. Production of Expanded Beads
[Step (1)]

50 kg of the obtained raw material particles and 270 liters of water as a dispersing medium were charged in a 400-liter autoclave equipped with a stirrer, and 0.2 part by weight of kaolin as a dispersant and 0.008 part by weight of a sodium alkylbenzenesulfonate as a surfactant based on 100 parts by weight of the raw material particles were further added to the dispersing medium.

The temperature was raised while stirring the contents within the autoclave; after reaching an impregnation temperature shown in Tables 1 and 2, carbon dioxide as a blowing agent was fed under pressure into the autoclave until the pressure within the closed vessel reached an impregnation pressure shown in Tables 1 and 2; and the resultant was kept at that temperature for 15 minutes while maintaining the impregnation pressure.
[Step (2)]

Thereafter, a back pressure with carbon dioxide was applied, and the raw material particles having the blowing agent impregnated therein were released under atmospheric pressure (0.1 MPa) together with the dispersing medium at a temperature (expansion temperature) of the dispersing medium shown in Tables 1 and 2 while adjusting the pressure within the vessel in terms of an expansion pressure shown in Tables 1 and 2 in a fixed level, thereby obtaining expanded beads.

The obtained expanded beads were put into a closed vessel and pressurized with compressed air of 0.3 MPa (G) at 30° C. for 12 hours. Thereafter, the pressure was released, and the resultant was allowed to stand under atmospheric pressure at 40° C. for 48 hours.

The apparent density and melt flow rate of the obtained expanded beads are shown in Tables 1 and 2.

4. Production of Expanded TPU Beads Molded Article

The obtained expanded beads were filled in a mold for flat plate molding having a rectangular parallelepiped shape and having a length of 200 mm, a width of 250 mm, and a thickness of 20 mm, and a steam was fed to heat the expanded beads until reaching the pressure (molding pressure) shown in Tables 1 and 2. After completion of cooling, a molded article was taken out from the mold, thereby obtaining an expanded TPU beads molded article in a plate shape.

An apparent density of each of the obtained molded articles is shown in Tables 1 and 2.

5. Measurement of $T_1$ and $T_2$ of Expanded Beads
[$T_1$ Measurement and $T_2$ Measurement]

About 2 mg of a measurement sample was cut out from the expanded beads; and according to the heat flux differential scanning calorimetry in conformity with JIS K7121-1987, the measurement sample was heated from 20° C. to 260° C. at a heating rate of 10° C./min, to obtain a DSC curve at the time of first heating, the temperature was then dropped from 260° C. to 20° C. at a cooling rate of 10° C./min, and the temperature was again raised to 260° C. at a heating rate of 10° C./min, to obtain a DSC curve at the time of second heating. Based on these DSC curves, a melting peak temperature of the DSC curve at the time of first heating and a melting peak temperature of the DSC curve at the time of second heating were measured. This measurement was performed with respect to ten different expanded beads, and the melting peak temperature ($T_1$) of the expanded beads at the time of first heating and the melting peak temperature ($T_2$) of the expanded beads at the time of second heating each is obtained as an arithmetic average value of the measured values.

Furthermore, from the measured $T_1$ and $T_2$, a $\Delta T$ ($T_1-T_2$) that is a difference therebetween was calculated, and $T_1$, $T_2$, and $\Delta T$ are shown in Tables 1 and 2.

As a DSC measurement apparatus, Model No.: DSC7020, manufactured by SII Nano Technology Inc. was used.

6. Measurement Methods of Various Physical Properties

Various physical properties of the raw material particles, the expanded beads, and the molded articles in the Examples and Comparative Examples are those determined by the following methods.

The apparent density of each of the expanded beads and the molded articles was measured after conditioning by allowing the expanded beads or molded article to stand at a relative humidity of 50% and at 23° C. under atmospheric pressure for 2 days.

(1) Melting Temperature

As a peak temperature of a melting peak appearing in a DSC curve obtained when according to the heat flux differential scanning calorimetry in conformity with JIS K7121-1987, about 2 mg of the raw material TPU was heated from 20° C. to 260° C. at a heating rate of 10° C./min, the temperature was then dropped from 260° C. to 20° C. at a cooling rate of 10° C./min, and the temperature was again raised to 260° C. at a heating rate of 10° C./min, a melting temperature of the raw material TPU was measured. In addition, a melting temperature of the raw material particles was measured in the same manner, except for using the raw material particles in place of the raw material TPU as the measurement sample.

(2) Melt Flow Rate (MFR)

The melt flow rate of each of the raw material TPU, the raw material particles, and the expanded beads was measured under a test condition at 190° C. under a load of 10 kg on a basis of JIS K7210-2:2014. After vacuum drying the raw material TPU, the raw material particles, or the expanded beads in a vacuum oven at 80° C. for 4 hours to adjust the water content thereof to 500 ppm by mass or less, the MFR was measured.

(3) Apparent Density

In a graduated measuring cylinder charged with water at a temperature of 23° C., the expanded beads having a weight W1 were sunk using a wire net. Then, taking into consideration the volume of the wire net, a volume V1 [cm$^3$] of the expanded beads as read out from the level rise was measured, the weight W1 [g] of the expanded beads was divided by the volume V1 (W1/V1), and the unit was converted into [kg/m$^3$], thereby determining the apparent density of the expanded beads.

(4) Average Cell Diameter

The average cell diameter of the expanded beads was determined in conformity with ASTM D3576-77. First of all, 10 expanded beads were selected at random. Each of the expanded beads was bisected so as to pass through the center thereof. An enlarged photograph of one cross section of the respective cut expanded bead was taken by a scanning electron microscope. Four line segments were drawn equiangularly at every 45° from the outermost surface of the expanded bead in the enlarged photograph so as to pass through the center thereof until reaching the outermost surface on the opposite side. The number of cells crossing each of the line segments was measured, respectively, and a total length of the four line segments was divided by the total number of cells crossing the line segments to determine an average chord length of the cells, which was further divided by 0.616, thereby determining the cell diameter of each of the expanded beads. These values were arithmetically averaged, thereby determining the average cell diameter of the expanded beads.

(5) Apparent Density of Molded Article

A weight of the molded article was divided by an apparent volume of the molded article determined by the water immersion method using water at a temperature of 23° C., and the unit was converted into [kg/m$^3$], thereby determining the apparent density of the molded article.

7. Evaluation Methods of Molded Article (1) Fusion Bonding Properties

A degree of fusion bonding of the obtained molded article was measured. The case where the degree of fusion bonding is 80% or more and less than 100% was evaluated as "A", and the case where the degree of fusion bonding is less than 80% was evaluated as "C". The evaluation results are shown in Tables 1 and 2.

The degree of fusion bonding of the molded article was measured by the following method.

A test piece was cut out from the molded article so as to set the length to 170 mm and the width to 30 mm, respectively while allowing the thickness to stand as it was. One of the surfaces of this test piece was incised with a cutter knife in a depth of about 10 mm so as to bisect the length of the test piece, and the molded article was bent from the incised part and fractured. A ratio (m/n×100 [%]) of the number (m) of material-fractured expanded beads existent on the fractured surface to the number (n) of all of the expanded beads existent on the fractured surface was calculated.

In the case where even when the molded article was bent, it could not be fractured, the degree of fusion bonding was defined as 100%. The measurement was performed five times using different test pieces, and a rate of material fracture of each test piece was determined and then arithmetically averaged to define the degree of fusion bonding.

(2) Shrinkage Factor

A shrinkage factor of the molded article was calculated according to the following formula, and the results are shown in Tables 1 and 2.

(Shrinkage factor)=[250 [mm]−(Length of width of molded article [mm])]/250 [mm]

(3) Surface Appearance

The appearance of the molded article was visually observed and evaluated according to the following criteria.

A: The case where voids (gaps among expanded beads) on the surface of the molded article is less and smooth.

C: The case where a molded article cannot be obtained, or the case where only a molded article in which large gaps are existent among the expanded beads from the surface of the molded article to the interior thereof is obtained.

TABLE 1

| | | | Example 1 | | | Example 2 | | | Example 3 | | | Example 4 | | | Example 5 | | | Example 6 | | |
|---|---|---|---|---|---|---|---|---|---|---|---|---|---|---|---|---|---|---|---|---|
| Raw material TPU | Abbreviation | — | TPU1 | | | TPU1 | | | TPU1 | | | TPU2 | | | TPU2 | | | TPU2 | | |
| | Type | — | Ether-based TPU | | | Ether-based TPU | | | Ether-based TPU | | | Ether-based TPU | | | Ether-based TPU | | | Ether-based TPU | | |
| Raw material particles | Color | — | Non-colored | | | Non-colored | | | Non-colored | | | Blue | | | Blue | | | Blue | | |
| | Talc | Parts by weight | 0.1 | | | 0.1 | | | 0.1 | | | 0.1 | | | 0.1 | | | 0.02 | | |
| | Melting temperature | ° C. | 165 | | | 165 | | | 165 | | | 165 | | | 165 | | | 165 | | |
| Production condition of expanded beads | Impregnation temperature | ° C. | 129.0 | | | 132.8 | | | 135.0 | | | 132.5 | | | 135.0 | | | 134.0 | | |
| | Impregnation pressure | MPa (G) | 4.0 | | | 3.0 | | | 2.6 | | | 3.0 | | | 2.6 | | | 2.6 | | |
| | Impregnation time | min | 15 | | | 15 | | | 15 | | | 15 | | | 15 | | | 15 | | |
| | Expansion temperature | ° C. | 129.0 | | | 132.8 | | | 135.0 | | | 132.5 | | | 135.0 | | | 134.0 | | |
| | Expansion pressure | MPa (G) | 4.0 | | | 3.0 | | | 2.6 | | | 3.0 | | | 2.6 | | | 2.6 | | |
| Expanded beads | $T_1$ | ° C. | 164.7 | | | 167.5 | | | 168.7 | | | 167.7 | | | 169.2 | | | 168.1 | | |
| | $T_2$ | ° C. | 164.3 | | | 164.2 | | | 164.0 | | | 164.0 | | | 164.2 | | | 163.9 | | |
| | ΔT | ° C. | 0.4 | | | 3.3 | | | 4.7 | | | 3.7 | | | 5.0 | | | 4.2 | | |
| | Apparent density | $kg/m^3$ | 210 | | | 174 | | | 181 | | | 157 | | | 170 | | | 186 | | |
| | MFR | g/10 min | 20 | | | 20 | | | 20 | | | 28 | | | 28 | | | 31 | | |
| | Average cell diameter | µm | 140 | | | 235 | | | 323 | | | 177 | | | 281 | | | 231 | | |
| Molding condition | Molding pressure | MPa (G) | 0.325 | 0.350 | 0.375 | 0.275 | 0.300 | 0.325 | 0.250 | 0.275 | 0.300 | 0.250 | 0.275 | 0.300 | 0.225 | 0.250 | 0.275 | 0.250 | 0.275 | 0.300 |
| Molded article | Apparent density | $kg/m^3$ | 281 | 282 | 295 | 233 | 227 | 228 | 235 | 233 | 234 | 210 | 207 | 205 | 216 | 217 | 215 | 232 | 232 | 242 |
| | Fusion bonding properties | — | A | A | A | A | A | A | A | A | A | A | A | A | C | A | A | A | A | A |
| | Shrinkage factor | % | 5.6 | 5.4 | 6.0 | 4.0 | 3.8 | 3.6 | 3.6 | 3.4 | 3.4 | 4.0 | 4.0 | 3.6 | 3.2 | 3.2 | 3.0 | 3.6 | 3.6 | 4.0 |
| | Surface appearance | — | C | A | C | A | A | C | C | A | A | A | A | A | A | A | A | A | A | C |

TABLE 2

|  |  |  | Comparative Example 1 | | | Comparative Example 2 | | | Comparative Example 3 | | | Comparative Example 4 | | |
| --- | --- | --- | --- | --- | --- | --- | --- | --- | --- | --- | --- | --- | --- | --- |
| Raw material TPU | Abbreviation | — | TPU1 | | | TPU1 | | | TPU2 | | | TPU2 | | |
| | Type | — | Ether-based TPU | | | Ether-based TPU | | | Ether-based TPU | | | Ether-based TPU | | |
| Raw material particles | Color | — | Non-colored | | | Non-colored | | | Blue | | | Blue | | |
| | Talc | Parts by weight | 0.1 | | | 0.1 | | | 0.1 | | | 0.1 | | |
| | Melting temperature | °C. | 165 | | | 165 | | | 165 | | | 165 | | |
| Production condition of expanded beads | Impregnation temperature | °C. | 126.0 | | | 138.0 | | | 126.0 | | | 138.0 | | |
| | Impregnation pressure | MPa (G) | 4.0 | | | 2.0 | | | 4.0 | | | 2.0 | | |
| | Impregnation time | min | 15 | | | 15 | | | 15 | | | 15 | | |
| | Expansion temperature | °C. | 126.0 | | | 138.0 | | | 126.0 | | | 138.0 | | |
| | Expansion pressure | MPa (G) | 4.0 | | | 2.0 | | | 4.0 | | | 2.0 | | |
| Expanded beads | $T_1$ | °C. | 162.5 | | | 171 | | | 163.2 | | | 171.4 | | |
| | $T_2$ | °C. | 163.4 | | | 162.7 | | | 164.2 | | | 162.3 | | |
| | ΔT | °C. | −0.9 | | | 8.3 | | | −1.0 | | | 9.1 | | |
| | Apparent density | kg/m³ | 204 | | | 271 | | | 230 | | | 204 | | |
| | MFR | g/10 min | 20 | | | 20 | | | 28 | | | 28 | | |
| | Average cell diameter | μm | 106 | | | 474 | | | 110 | | | 450 | | |
| Molding condition | Molding pressure | MPa (G) | 0.375 | 0.400 | 0.425 | 0.200 | 0.225 | 0.250 | 0.375 | 0.400 | 0.425 | 0.200 | 0.225 | 0.250 |
| Molded article | Apparent density | kg/m³ | 232 | 230 | 230 | 269 | 274 | 279 | 250 | 252 | 250 | 240 | 241 | 248 |
| | Fusion bonding properties | — | C | C | A | C | C | A | C | C | A | C | C | A |
| | Shrinkage factor | % | 6.8 | 6.6 | 6.6 | 2.4 | 2.2 | 2.8 | 6.4 | 6.4 | 6.8 | 2.0 | 2.2 | 2.6 |
| | Surface appearance | — | C | A | C | A | A | C | C | A | C | A | A | C |

As is noted from the evaluation results shown in Tables 1 and 2, in the molded articles obtained through in-mold molding of the expanded beads of Comparative Examples 1 and 3 in which the ΔT is lower than 0° C., although the fusion bonding properties of the expanded beads were excellent, the molded articles were largely shrunk, whereas in the molded articles of Comparative Examples 2 and 4 in which the ΔT is higher than 8° C., although the shrinkage factor could be minimized, the fusion bonding properties were not excellent.

In contrast, in all of the molded articles obtained through in-mold molding of the expanded beads of Examples 1 to 6 in which the ΔT of the expanded TPU beads falls within the range of 0 to 8° C. were not only excellent in the surface appearance and the fusion bonding properties but also low in the shrinkage factor.

The invention claimed is:

1. Expanded beads of thermoplastic polyurethane, wherein the thermoplastic polyurethane constituting the expanded beads is an ether-based thermoplastic polyurethane, and a difference $(T_1-T_2)$ between a melting peak temperature $(T_1)$ and a melting peak temperature $(T_2)$ is from 0 to 8° C., wherein the melting peak temperature $(T_1)$ is a melting peak temperature at the time of first heating in a DSC curve obtained by heating the expanded beads from 20° C. to 260° C. at a heating rate of 10° C./min, the melting peak temperature $(T_2)$ is a melting peak temperature at the time of second heating in a DSC curve obtained by cooling from 260° C. to 20° C. at a cooling rate of 10° C./min after the first heating and further heating again from 20° C. to 260° C. at a heating rate of 10° C./min, and the DSC curves are obtained by the heat flux differential scanning calorimetry in conformity with JIS K7121-1987, wherein a type A durometer hardness of the thermoplastic polyurethane is 85 to 90, and wherein an average cell diameter of the expanded beads is 100 μm to 400 μm.

2. The expanded beads of thermoplastic polyurethane according to claim 1, wherein the difference $(T_1-T_2)$ between the melting peak temperature $(T_1)$ at the time of first heating and the melting peak temperature $(T_2)$ at the time of second heating is from 1 to 6° C.

3. The expanded beads of thermoplastic polyurethane according to claim 1, wherein the melting peak temperature $(T_2)$ at the time of second heating is from 155 to 170° C.

4. The expanded beads of thermoplastic polyurethane according to claim 1, wherein a melt flow rate at 190° C. under a load of 10 kg of the expanded beads is from 18 to 35 g/10 min.

5. The expanded beads of thermoplastic polyurethane according to claim 1, wherein an apparent density of the expanded beads is from 80 to 300 kg/m³.

6. An expanded thermoplastic polyurethane beads molded article obtained through in-mold molding of the expanded beads of thermoplastic polyurethane according to claim 1.

7. The expanded beads of thermoplastic polyurethane according to claim 1, wherein the thermoplastic polyurethane consists essentially of the ether-based thermoplastic polyurethane.

8. The expanded beads of thermoplastic polyurethane according to claim 1, wherein the average cell diameter of the expanded beads is 150 μm to 400 μm.

* * * * *